United States Patent
Furihata et al.

(10) Patent No.: US 10,949,988 B2
(45) Date of Patent: Mar. 16, 2021

(54) INFORMATION PROCESSING APPARATUS, INFORMATION PROCESSING METHOD, AND PROGRAM

(71) Applicant: CANON KABUSHIKI KAISHA, Tokyo (JP)

(72) Inventors: Hisayoshi Furihata, Tokyo (JP); Masahiro Suzuki, Kawasaki (JP); Akihiro Katayama, Tokyo (JP); Masakazu Fujiki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 113 days.

(21) Appl. No.: 16/096,620

(22) PCT Filed: Apr. 7, 2017

(86) PCT No.: PCT/JP2017/014511
§ 371 (c)(1),
(2) Date: Oct. 25, 2018

(87) PCT Pub. No.: WO2017/187935
PCT Pub. Date: Nov. 2, 2017

(65) Prior Publication Data
US 2019/0156503 A1    May 23, 2019

(30) Foreign Application Priority Data

Apr. 28, 2016    (JP) ............... JP2016-091608

(51) Int. Cl.
*G06T 7/593*    (2017.01)
*G06K 9/62*    (2006.01)

(52) U.S. Cl.
CPC ............ *G06T 7/593* (2017.01); *G06K 9/6202* (2013.01); *G06K 2009/6213* (2013.01);
(Continued)

(58) Field of Classification Search
CPC ...... H04N 13/122; H04N 13/30; G06T 7/593; G06T 2207/10012; G06T 5/002;
(Continued)

(56) References Cited

U.S. PATENT DOCUMENTS

2009/0279808 A1* 11/2009 Shiraishi ................ G06T 5/002
                                                   382/275
2014/0085434 A1*  3/2014 Ogura .................... G06T 5/002
                                                   348/51
(Continued)

FOREIGN PATENT DOCUMENTS

| JP | 2006-012166 A | 1/2006 |
| JP | 2014-534665 A | 12/2014 |
| WO | 2014/049894 A1 | 4/2014 |

OTHER PUBLICATIONS

Atsuhiko Banno et al; Disparity map refinement and 3D surface smoothing via Directed Anisotropic Diffusion; 2009 IEEE 12th International Conference on Computer Vision Workshops, ICCV Workshops, pp. 1870-1877.

(Continued)

*Primary Examiner* — Margaret G Mastrodonato
(74) *Attorney, Agent, or Firm* — Canon U.S.A., Inc. IP Division (57) ABSTRACT

An information processing apparatus includes an acquiring unit configured to acquire first data and second data, a deriving unit configured to derive gradient data describing a gradient of correspondence data on the basis of the correspondence data describing a correspondence between partial data of the first data and partial data of the second data, and a propagating unit configured to propagate the correspondence data on the basis of the gradient data.

12 Claims, 6 Drawing Sheets

(52) U.S. Cl.
CPC ............... *G06T 2207/10012* (2013.01); *G06T 2207/20021* (2013.01); *G06T 2207/20024* (2013.01)

(58) Field of Classification Search
CPC ........... G06T 2207/20021; G06T 2207/20024; G06K 9/6202; G06K 2009/6213
See application file for complete search history.

(56) References Cited

U.S. PATENT DOCUMENTS

| | | | |
|---|---|---|---|
| 2014/0098089 A1* | 4/2014 | Sutou ................... | H04N 13/128 345/419 |
| 2015/0358612 A1* | 12/2015 | Sandrew ............ | H04N 5/23238 348/36 |
| 2018/0027224 A1* | 1/2018 | Javidnia ............... | H04N 13/271 382/154 |
| 2020/0051264 A1* | 2/2020 | Mishima ................... | G06T 7/55 |

OTHER PUBLICATIONS

Angel Licon-Trillo et al; Edge Detection Based on a PCNN-Anisotropic Diffusion Synergetic Approach; 2009 AISC, vol. 56, pp. 311-321.
Wenxian Hong; A Study of Fast, Robust Stereo-Matching Algorithms ; Massachusetts Institute of Technology, 2009 pp. 1-117.
Michael Bleyer; Patch Match stereo—stereo matching with slanted support windows; BMVC 2011; pp. 1-11.

* cited by examiner

INFORMATION PROCESSING APPARATUS, INFORMATION PROCESSING METHOD, AND PROGRAM

CROSS-REFERENCE TO RELATED APPLICATIONS

The present application is a National Phase application of International Patent Application No. PCT/JP2017/014511, filed Apr. 7, 2017, entitled "INFORMATION PROCESSING APPARATUS, INFORMATION PROCESSING METHOD, AND PROGRAM", which claims priority to Japanese Patent Application No. 2016-091608, filed on Apr. 28, 2016, all of which are hereby expressly incorporated by reference herein in their entirety.

TECHNICAL FIELD

The present invention relates to a technology for acquiring a correspondence between data sets.

BACKGROUND ART

From the past, a correspondence between a plurality of data sets is acquired for use in various kinds of processing. For example, a correspondence between local regions of a plurality of images may be estimated on the basis of a matching degree between pixel values therein (by image block matching, for example). This may be used for estimation of a parallax or a distance based on stereo images, recognition and tracking of an object on an image, and synthesis and editing of an image or images, for example.

Any data excluding image data may be subject to the estimation method, without limiting image data. For example, the correspondence-based estimation method has been examined for various types of data such as one-dimensional audio or text data and three-dimensional moving picture or voxel data.

NPL 1 discloses a method for estimating a map of correspondence data (parallax data) showing a correspondence between coordinates on stereo images. A map of correspondence data is estimated by repeating the following two processes. First of all, correspondence data at a coordinate position on a map are propagated to data at a surrounding position such that the correspondence data can be replaced by correspondence data having a higher evaluation value. Correspondence data at coordinates on the map are changed randomly so that the correspondence data can be replaced by correspondence data having a higher evaluation value. The evaluation value is calculated in accordance with the matching degree between two local regions on stereo images described by correspondence data.

However, because, according to the method disclosed in NPL 1 correspondence data are randomly varied, the probability for drawing correspondence data having a high evaluation value is low. For that, conversion to correspondence data with higher accuracy may take time disadvantageously.

CITATION LIST

Non Patent Literature

NPL 1: "Patch Match stereo—stereo matching with slanted support windows", BMVC 2011, Michael Bleyer 1, Christoph Rhemann 1, Carsten Rother,

SUMMARY OF INVENTION

The present invention herein provides an information processing apparatus including an acquiring unit configured to acquire first data and second data, a deriving unit configured to derive gradient data describing a gradient of correspondence data on the basis of the correspondence data describing a correspondence between partial data of the first data and partial data of the second data, and a propagating unit configured to propagate the correspondence data on the basis of the gradient data.

According to the present invention, correspondence data describing a correspondence between input data sets can be estimated at a high speed and with high accuracy.

Further features of the present invention will become apparent from the following description of exemplary embodiments with reference to the attached drawings.

DESCRIPTION OF EMBODIMENTS

Figure 7:
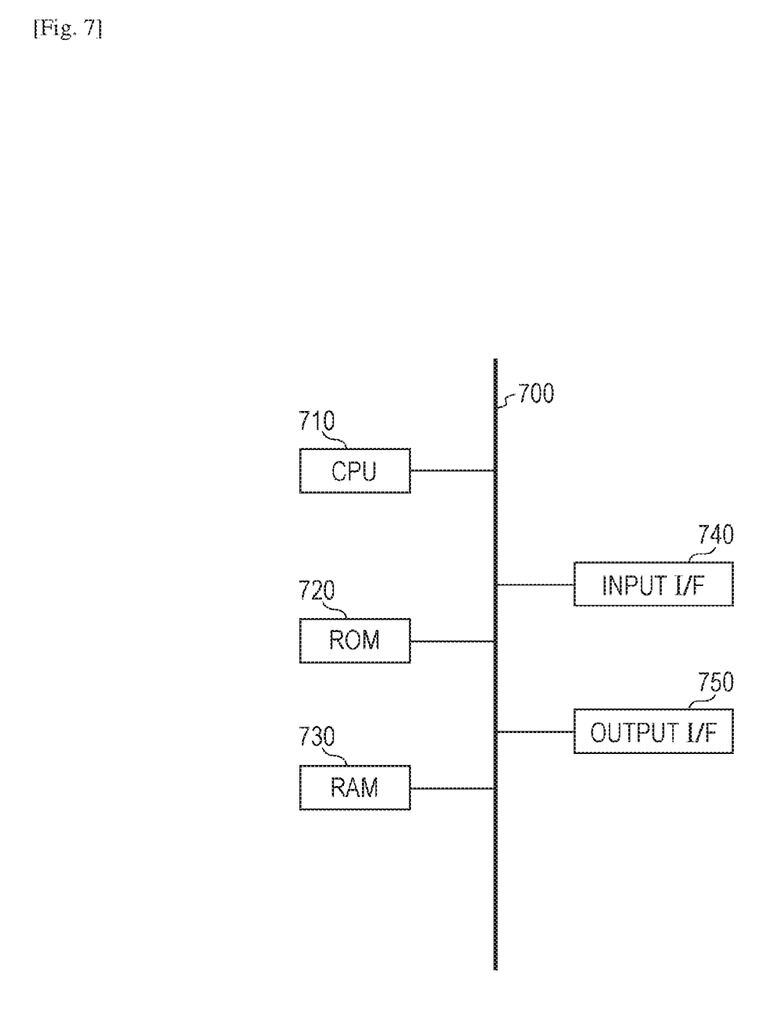
FIG. 7 illustrates a hardware configuration example of an information processing apparatus according to the present invention.

A hardware configuration of an information apparatus according to embodiments will be described with reference to FIG. 7, which is followed by detail descriptions of embodiments of the present invention. Referring to FIG. 7, a CPU 710 is configured to generally control devices connected thereto via a bus 700. The CPU 710 reads out and executes processing steps and programs stored in a read-only memory (ROM) 720. An operating system (OS) and processing programs and device drivers according to an embodiment may be stored in the ROM 720, may be temporarily stored in a random access memory (RAM) 730, and may be executed by the CPU 710 as requested. An input I/F 740 is configured to input an image from an external apparatus (such as an image capturing device) as an input signal having a format processable in an information processing apparatus 1. An output I/F 750 is configured to output a corresponding feature, for example, having a format processable by an external apparatus to the external apparatus as an output signal.

First Embodiment

A first embodiment will be described schematically. First, stereo images acquired by imaging a target from two different viewpoint positions are acquired. For each local region (partial data) of one image (first image) of the acquired stereo images, a corresponding local region of the other image (second image) is acquired. Then, correspondence data (parallax data in this embodiment) describing a correspondence between the local regions are estimated. Correspondence data having a higher matching degree are propagated (or replaced) on the basis of a gradient of the correspondence data for acquiring correspondence data with higher accuracy.

According to this embodiment, parallax data are estimated, for example. However, according to a variation example, which will be described below, data excluding parallax data may be estimated as correspondence data. Therefore, correspondence data according to the present invention is not limited to parallax data.

According to this embodiment, parallax data regarding pixels on stereo images are held as an image format having an arrangement of an equal resolution to that of the images. The map holds gradient data describing a gradient of parallax data. A gradient of parallax data represents a change in parallax data against a change in coordinate on a map.

Figure 2:
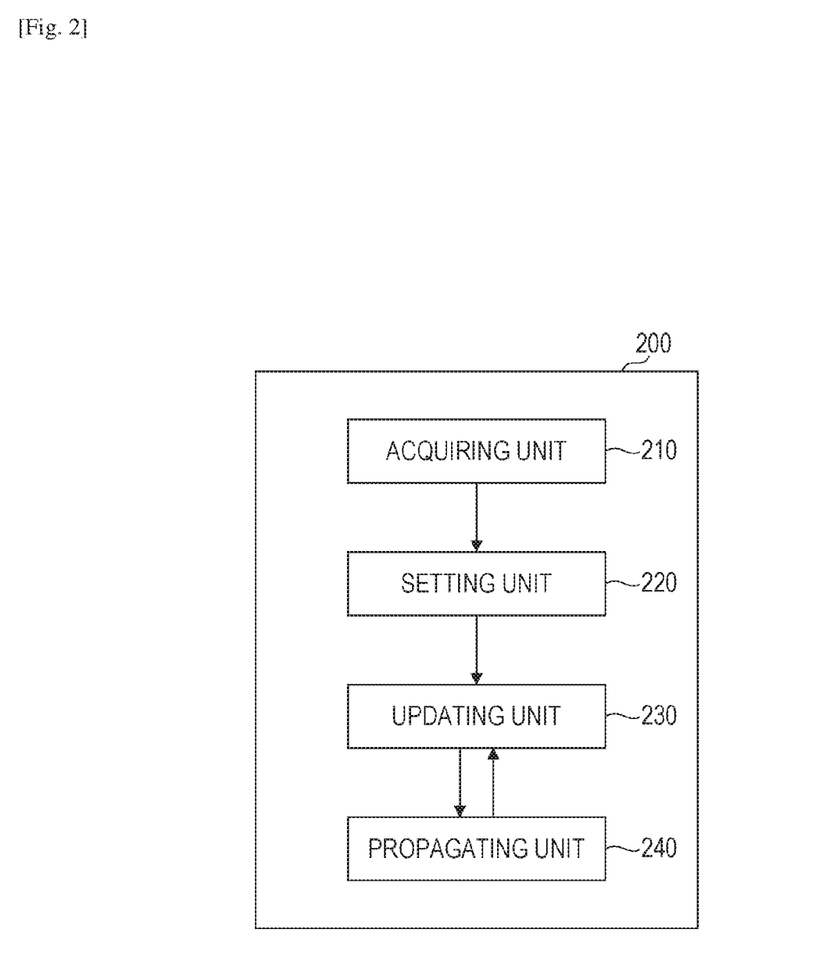
FIG. 2 illustrates a functional block in an information processing apparatus according to the first embodiment.

Next, with reference to FIG. 2, a functional configuration of an information processing apparatus 200 according to this embodiment will be described. The information processing apparatus 200 according to this embodiment includes an acquiring unit 210, a setting unit 220, an updating unit 230, and a propagating unit 240.

The acquiring unit 210 is configured to acquire two images by photographing an object from two different viewpoints (imaging positions). Images may be acquired directly in a wired or wireless manner from an image capturing device, or images photographed in advance may be acquire from, for example, a server storing those images over a network. Images may not only be captured by an image capturing device but may be rendered in computer graphics, for example. This embodiment assumes that two images are captured by two image capturing devices aligned horizontally, and intrinsic parameters and extrinsic parameters of the image capturing devices are calibrated and are known information. In order to estimate parallax data between the images with high accuracy, a photographed object desirably contains texture. Texture may be projected to an object to be photographed by using a projector, and images may be captured therefrom. Correspondence data may be estimated correctly even from, for example, a plain object to which texture is projected.

The setting unit 220 is configured to set initial values of a parallax indicating a correspondence between local regions of two images acquired by the acquiring unit 210. Parallax data are calculated with reference to one image of stereo images. According to this embodiment, as described above, parallax data and gradient data are held in association with coordinate positions on an image-format map having an arrangement of a resolution equal to that of images. According to this embodiment, a map with reference to an image I1 is held. Hereinafter, it is assumed that the map has a two-dimensional arrangement having an equal number of elements (number of pixels) to that of the acquired images. In this case, for example, parallax data C(u,v) corresponding to coordinates (u,v) on the map represent a parallax between the coordinates (u,v) on the image I1 and corresponding coordinates on an image I2. The parallax here is a one-dimensional parallax in an X axis direction of the images. In other words, parallax data C(u,v) is a one-dimensional numerical value of a parallax between the two images at (u,v).

Gradient data Gx(u,v) and Gy(u,v) are one-dimensional numerical values representing gradients of coordinates C(u,v) in the X-axis and Y-axis directions, respectively, of the map. A notation G(u,v) refers to a vector including both of Gx(u,v) and Gy(u,v).

The updating unit 230 is configured to update(derive) gradient data G(u,v) of each pixel on a map on the basis of a distribution of parallax data around the pixel. An updating method will be described in detail below. According to this embodiment, gradient data are estimated from a distribution of parallax data. However, an external sensor may be used to estimate gradient data. For example, a distance sensor may be provided, and, on the basis of a distance image measured by the distance sensor, gradient data on a map may be set.

The propagating unit 240 is configured to propagate parallax data C(u,v) at a coordinate position (u,v) on a map in a direction of a gradient indicated by gradient data G(u,v) and is replaced by parallax data having a higher evaluation value.

Among the setting unit 220, the updating unit 230, and the propagating unit 240, (i) the setting unit 220 sets initial parallax data of two images, as described above. (ii) Then, the updating unit 230 generates gradient data on the basis of the initial parallax data. (iii) The propagating unit 240 then propagates the parallax data on the basis of the generated gradient data. (iv) The updating unit 230 then updates the gradient data on the basis of the propagated parallax data. (v) The propagating unit 240 then propagates the parallax data again on the basis of the updated gradient data. The operations in (i) and (ii) are to be performed in the first repeated calculation, and the operations in (iii) to (v) are to be repeated in the other calculations so that the accuracy of the parallax data can get closer to a true value.

Figure 3:
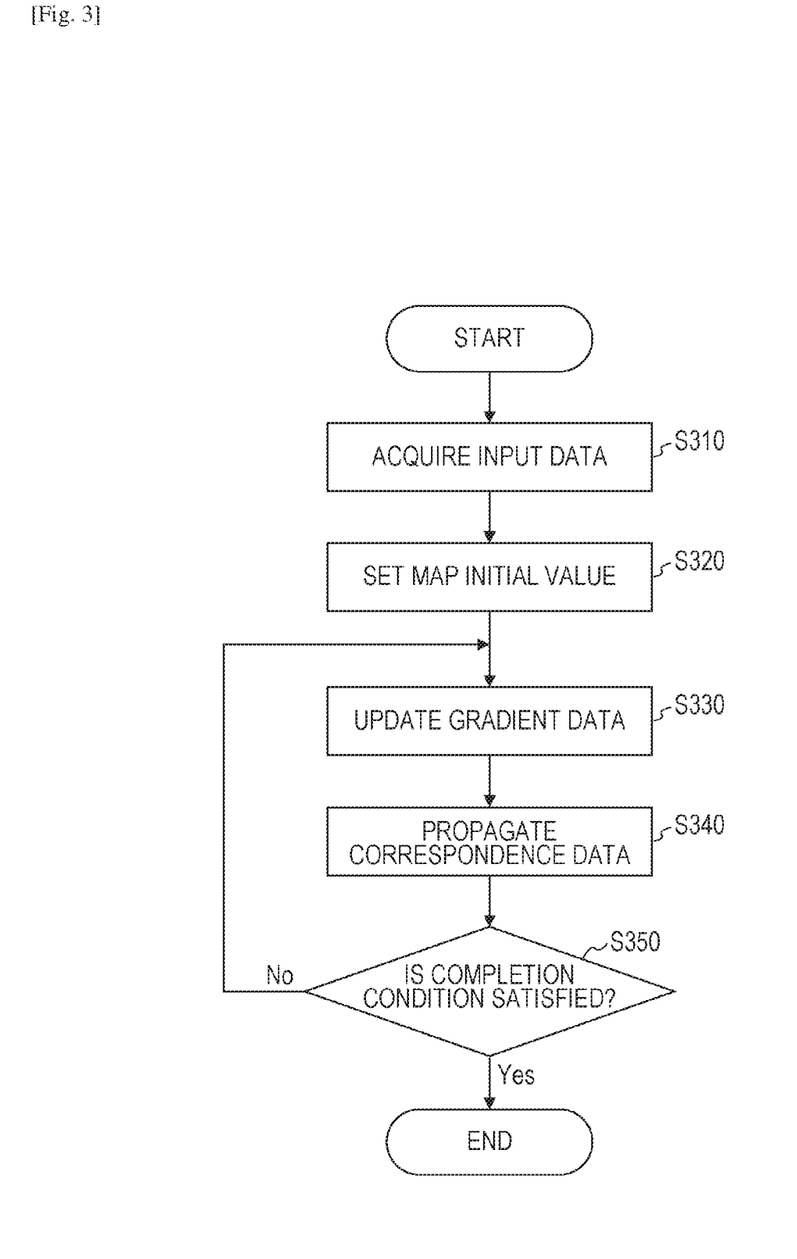
FIG. 3 is a flowchart illustrating processing to be executed in the information processing apparatus according to the first embodiment.

Next a processing procedure of this embodiment will be described. FIG. 3 is a flowchart illustrating a processing procedure according to this embodiment.

Step S310

The acquiring unit 210 acquires two images acquired by photographing an object from different photographing positions. According to this embodiment, one image of the two images is indicated by I1, and an image corresponding to the right eye is indicated by I2. In the following description, a pixel value on the images is indicated by I1(u,v) or I2(u,v). u and v are coordinates about an X axis and a Y axis on the images.

Step S320

The setting unit 220 sets initial values of parallax data of coordinates on a map. According to this embodiment, parallax data are set randomly for each coordinate. More specifically, parallax data may be set by using Expression (1).

$$C(u,v) = \text{Rand}*(C\text{max}-C\text{min})+C\text{min} \qquad (1)$$

Expression (1) sets numerical values Cmax to Cmin randomly. Here, Rand is a uniform random number occurring in a range of 0 to 1. Cmax and Cmin are an upper limit and a lower limit, respectively, of a parallax of stereo images. Cmax and Cmin are preset fixed values. With thus randomly set values, different parallaxes are set among coordinate positions.

With highly accurate parallax data of a part of a map, correct parallax data may be propagated so that the accuracy of the parallax data of the entire map can be improved. Highly accurate parallax may be set in a part of a map with randomly set values. Therefore, according to this embodiment, the values are set in the manner as described above.

However, the initial values according to the present invention may be set in any other manner excluding the random setting method. More specifically, the initial values may be set by block matching which calculates correspondence data searchingly for coordinate positions on images. An optimization algorithm such as Graph Cut and Belief Propagation may be used to estimate and set correspondence data. Alternatively, in a case where a parallax is to be estimated from stereo images, a distance sensor may be provided separately, and on the basis of a distance image measured by the distance sensor, initial values on a map of the correspondence data may be set. More specifically, a distance image measured by the distance sensor may be converted to a three-dimensional point set, and the point set may be projected to coordinate systems of the stereo images to acquire distance values of coordinates on the stereo images. Next, the distance values of the coordinates are converted to a parallax, and the values of the parallax are set as initial values of the correspondence data. (The distance values and the parallax values have a one-to-one relationship and may be mutually converted.)

Step S330

The updating unit 230 updates (or generates) gradient data of coordinates on the map on the basis of a distribution of surrounding parallax data. According to this embodiment, a filter for measuring a gradient of parallax data is applied in an X axis direction and a Y axis direction to calculate gradient data of coordinates on a map.

More specifically, gradient data of coordinates on a map are calculated by using Expressions (2) and (3).

[Math. 1]
$$Gx(u,v) = \frac{C(u+k,v) - C(u-k,v)}{2k} \quad (2)$$

[Math. 2]
$$Gy(u,v) = \frac{C(u,v+k) - C(u,v-k)}{2k} \quad (3)$$

As in Expressions (2) and (3), gradient data are calculated as a gradient (change rate) of correspondence data of two positions spaced by k about coordinates (u,v) of interest. It is assumed here that k is a preset fixed value.

The gradient data may be calculated by any method instead of the method as described above if the calculation is performed on the basis of a distribution of parallax data. For example, a Sobel filter may be used for the calculation, or parallax data on a map may be differentiated for the calculation. Surface fitting may be performed on parallax data of a surrounding part of the coordinates of interest for calculating a gradient.

Figure 1A:
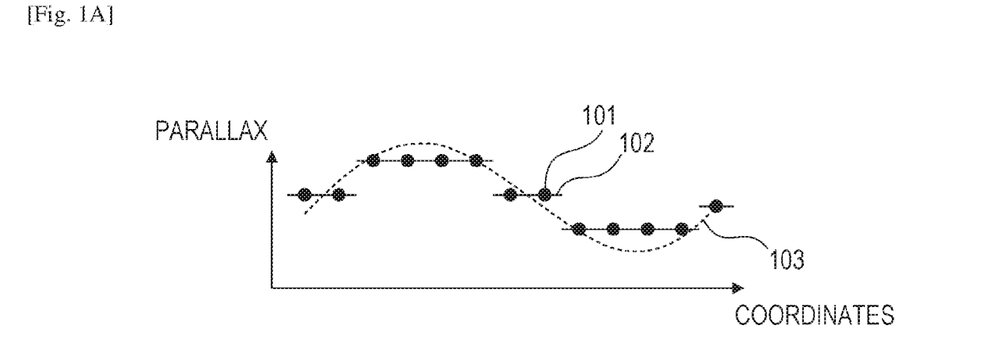
FIG. 1A schematically illustrates processing according to a first embodiment.

A line 102 in FIG. 1A represents gradient data regarding coordinates on the map calculated by the processing as described above. In this step, the first repeated calculation generates gradient data on the basis of initial values of the parallax data set in S320. In the second and subsequent repeated calculations, the current gradient data up are updated with the gradient data calculated by Expressions (2) and (3) on the basis of the parallax data propagated in S340. The first repeated calculation is less accurate because the gradient data are calculated on the basis of less accurate parallax data. For that, the gradient may be set as 0(Gx=0, Gy=0) in the first repeated calculation.

The gradient data of the coordinates on the map may further be updated on the basis of gradient data of a surrounding region thereof. For example, gradient data may be calculated from parallax data of a surrounding region of the coordinates (u,v) of interest, and an average of the calculated gradient data and the gradient data of the surrounding region of the coordinates (u,v) may be acquired to calculate the gradient data of the coordinates (u,v).

Step S340

Figure 4:
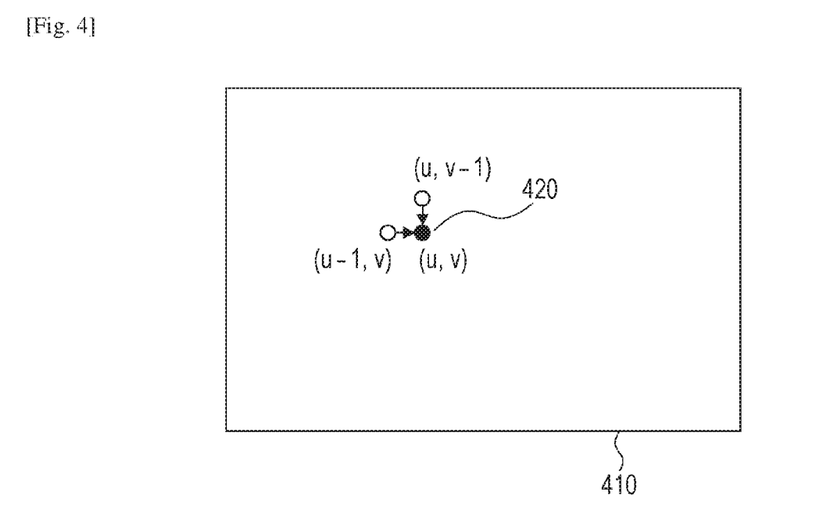
FIG. 4 illustrates an example map according to the first embodiment.

The propagating unit 240 propagates the parallax data of coordinates on the map in the direction of the gradient indicated by the gradient data to replace the parallax data by parallax data with a higher evaluation value. In addition to the replacement of the parallax data, the gradient data are also replaced. First, coordinate positions on the map are sequentially selected. According to this embodiment, a coordinate position is selected in order from an upper left coordinate position to a lower right coordinate position on the map in a manner according to raster scan. FIG. 4 illustrates a map 410. FIG. 4 further illustrates a selected coordinate position 420. Hereinafter, the selected coordinate position is at coordinates (u,v).

Next, the parallax data are propagated from a surrounding (neighborhood) coordinate position of the selected coordinate position at (u,v). According to this embodiment, parallax data of two of left and upper coordinate positions of the selected coordinate position at (u,v), that is, parallax data of coordinate positions at (u−1,v) and (u,v−1) are propagated toward the coordinate position at (u,v). In this case, the parallax data are changed in the direction of the gradient indicated by the gradient data. More specifically, in a case where the original coordinates with parallax data to be propagated are (s,t), the resulting coordinates are calculated by the following Expressions (4) and (5).

$$C'(u,v) = C(s,t) + (u-s)*Gx(s,t) + (v-t)*Gy(s,t) \quad (4)$$

$$G'(u,v) = G(s,t) \quad (5)$$

Here, C'(u,v) and G'(u,v) are data acquired by propagating parallax data and gradient data of coordinate (s,t) toward a selected coordinate position at (u,v). As in Expression (4), parallax data C'(u,v) are calculated by adding a change corresponding to a gradient of gradient data G(s,t) to the parallax data C(s,t) to be propagated. It should be noted that the gradient data are propagated by assuming that they are identical to the gradient data to be propagated. C1 is parallax data originally present at coordinates (u,v) (or before updated) in the following description. C2 and C3 are parallax data generated by propagating parallax data at two coordinate positions at (u−1,v) and (u,v−1).

Next, evaluation values for C1, C2, and C3 are calculated. An evaluation value for parallax data is calculated from a matching degree between local regions at coordinates (u,v) on the reference image I1 and at coordinates (u+C(u,v),v) on the image I2 acquired by adding a parallax thereto (or determined in consideration of the parallax). More specifically, according to this embodiment, an evaluation value E for parallax data C at coordinates (u,v) on the map is calculated on the basis of a SAD (Sum of Absolute Difference) expressed in Expression (6) and Expression (7).

[Math. 3]
$$E(u,v,P) = -SAD(u,v,P) = -\sum_{m=-w}^{w}\sum_{n=-w}^{w} D(u,v,m,n,C) \quad (6)$$

$$D(u,v,m,n,C) = |I1(u+m,v+n) - I2(u+m+C(u,v),v+n)| \quad (7)$$

An evaluation value E in Expression (6) has a value that increases as the matching degree between local regions on the images I1 and I2 increases. The letter "w" refers to a size of a local region for calculating a SAD. The size w has a preset fixed value. D in Expression (7) is a function for measuring a difference between pixel values at two coordinate positions described in parallax data with respect to a position (m,n) within a local region about coordinates (u,v). According to this embodiment, an absolute value of a difference of pixel values at two coordinate positions which differ by a value corresponding to the parallax data C is measured.

Next, the parallax data with the highest evaluation value of the parallax data C1, C2, and C3 at the coordinates (u,v) are allocated on the map as new parallax data at the coordinates (u,v). This processing replaces (or updates) parallax data on the map in a case where evaluation values for the parallax data C2 and C3 as a result of a propagation are higher than the evaluation value for the parallax data C1 originally present at the coordinates (u,v). In this case, the parallax data estimated by using Expressions (4) and (5) are set as new parallax data. Furthermore, in addition to the replacement of the parallax data at the coordinates (u,v), the gradient data thereat are replaced. It should be noted that the replacement of the gradient data may not be performed, but only the parallax data may be replaced.

These operations may be performed on sequentially selected coordinate positions at (u,v) so that the parallax data and gradient data on the entire map may be replaced.

The present invention is not limited to the sequential selection from an upper left coordinate position to a lower right coordinate position on a map. For example, sequential selection may be performed from a lower right coordinate position to an upper left coordinate position on a map. The selection may be performed in any direction. An image may be divided into a plurality of blocks, and a coordinate position may be selected in a predetermined direction in each of a sequentially selected one of the blocks. Coordinate positions may be selected randomly. How a coordinate position is to be selected in the propagating unit may vary between repetitions involving the propagating unit. For example, coordinates may be selected from an upper left coordinate position to a lower right coordinate position on a map in an odd-numbered repetition while coordinates may be selected from a lower right coordinate position to an upper left coordinate position on the map in an even-numbered repetition.

Having described the processing for propagating parallax data at the left and upper coordinate positions of a selected coordinate position at (u,v), that is, two coordinate positions at (u−1,v) and (u,v−1) toward the coordinates (u,v), the original coordinate position to be propagated may be any other coordinate position than the left and upper coordinate positions. Parallax data at right and lower coordinate positions of a selected coordinate position at (u,v), that is, coordinate positions at (u+1,v) and (u,v+1) may be propagated. Parallax data may be propagated from a plurality of coordinate positions or one coordinate position instead of two coordinate positions. Propagation of parallax may be started from a coordinate position spaced from the selected coordinate position by one or more coordinate positions. Parallax data may be propagated from a surrounding coordinate position to a selected coordinate position or, conversely, from a selected coordinate position to a surrounding coordinate position.

Step S350

In S350, the propagating unit 240 determines whether a completion condition is satisfied or not. According to this embodiment, the completion condition is that the operation performed by the updating unit 230 in S330 and the operation performed by the propagating unit 240 in S340 are repeated a predetermined or more number of times. If the operations have been repeated a predetermined or more number of times, the processing ends. If not, the processing return to step 330. After the operations are repeated a predetermined or more number of times, parallax data indicated by black dots are converged to true values indicated by a broken line as illustrated in FIG. 1C.

The completion of the repeated processing may be determined on the basis of an amount of change in parallax data on a map. For example, an amount of change in parallax data on a map may be calculated every time the repeated calculation is executed. If the amount of change is equal to or lower than a predetermined value, it may be determined to complete the processing. The amount of change in parallax data on a map may be any index if it is based on a difference on a map at different repetition time points. It may be an average value of differences between elements at coordinates on a map or may be a maximum value or a minimum value. According to this embodiment, the amount of change may be calculated on the basis of the state of a map after the processing performed by the updating unit 230 or on the basis of the state of the map after the processing performed by the propagating unit 240.

According to the present invention, parallax data may be propagated with higher accuracy by updating gradient data from parallax data of surrounding coordinate positions of a coordinate position of interest and propagating the parallax data in the direction of a gradient described by the gradient data.

How parallax data and gradient data are brought closer to a true value by the processing according to the present invention as described above will be described with reference to FIGS. 1A to 1C.

Figure 1B:
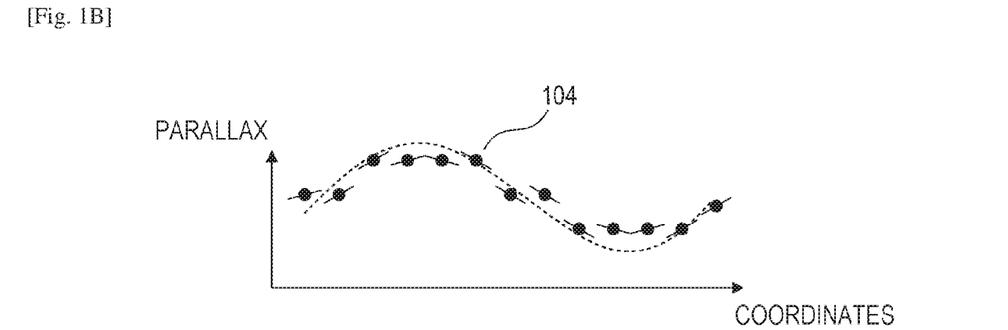
FIG. 1B schematically illustrates processing according to the first embodiment.
Figure 1C:
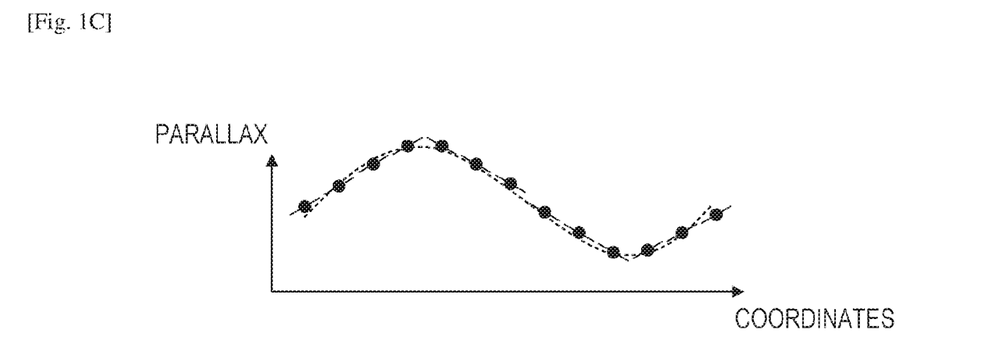
FIG. 1C schematically illustrates processing according to the first embodiment.

FIGS. 1A to 1C are graphs having a horizontal axis indicating a coordinate which is represented one dimensionally for simplicity and a vertical axis indicating a value of a parallax at the coordinate. Each of black dots 101 indicates parallax data corresponding to a coordinate, and a line 102 indicates gradient data of the parallax data. The graph in FIG. 1A illustrates parallax data and gradient data after processing of the first repeated calculation has completed. Because an initial value of parallax data is given randomly as described above, the first calculation still results in differences from true values of parallax data indicated by a broken line 103. FIG. 1B illustrates data 104 after the gradient data are updated by the second repeated calculation. In other words, the data 104 are data acquired after the gradient data are updated on the basis of a distribution of the parallax data in FIG. 1A. FIG. 1C illustrates data after propagation processing is performed again on the data in FIG. 1B, and the data are converged to true values. In other words, as described above, the processing for updating gradient data and the processing for propagating parallax data and the gradient data are repeated so that the parallax data can be converged to true values. Here, for brief description, the parallax data are converged to true values after two repeated calculations are performed, for example. However, in a case where an object has a complicated shape, more repeated calculations may be performed.

According to the present invention, in order to estimate a map showing a correspondence between input data sets, the correspondence data are propagated on the basis of gradient data calculated from a distribution of the correspondence data, as described above. Thus, the map can be estimated with higher accuracy.

Second Embodiment

According to the first embodiment, (i) the setting unit 220 sets initial parallax data of two images. (ii) Then, the updating unit 230 generates gradient data on the basis of the initial parallax data. (iii) The propagating unit 240 then propagates the parallax data on the basis of the generated gradient data. (iv) The updating unit 230 then calculates gradient data on the basis of the propagated parallax data and updates the gradient data held up to this point. (v) The propagating unit 240 then propagates the parallax data again on the basis of the updated gradient data. The operations in (i) and (ii) are to be performed in the first repeated calculation, and the operations in (iii) to (v) are to be repeated in the other calculations so that the accuracy of the parallax data can be close to a true value.

On the other hand, according to a second embodiment, the acquired gradient data is not held in (iv), but, in (v), parallax data are propagated by using gradient data calculated every time when a distribution of the parallax data is changed by a propagation operation. In other words, when a part of parallax data is changed by propagation, gradient data is re-calculated. Then, the processing for propagating other parallax data is performed by using the re-calculated gradient data. Thus, because gradient data immediately reflecting a distribution of parallax data to be propagated are calculated, an effect can be expected that the parallax data can be converged to true values by fewer repeated calculations.

According to this embodiment, like the first embodiment, correspondence data among coordinate positions on stereo images being input data are estimated with higher accuracy. This embodiment is different from the first embodiment in that parallax data on a map are only held but gradient data are not held, as described above. The gradient data are calculated from surrounding parallax data every time when a distribution of parallax data is changed by a propagation operation.

Figure 5:
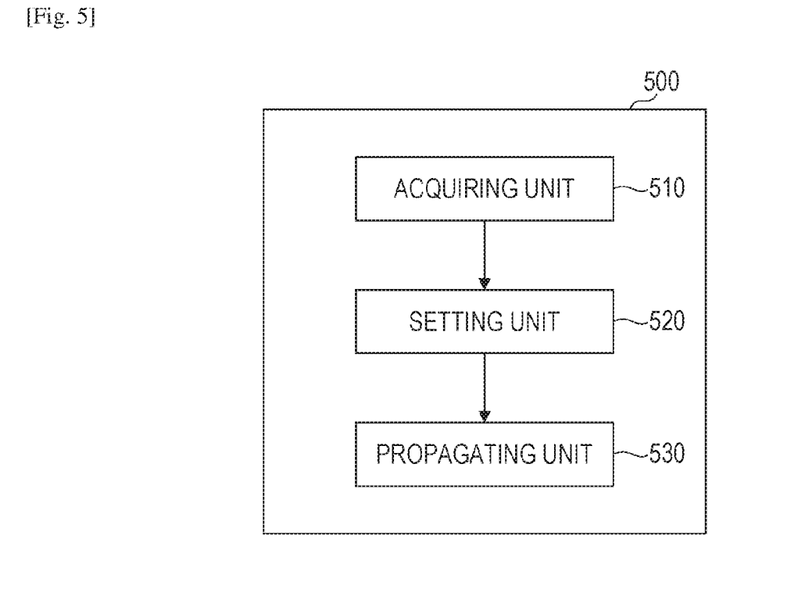
FIG. 5 illustrates a functional block in an information processing apparatus according to a second embodiment.

Next, a functional configuration of an information processing apparatus 500 according to this embodiment will be described with reference to FIG. 5. The information processing apparatus 500 includes an acquiring unit 510, a setting unit 520, and a propagating unit 530.

The processing to be performed by the acquiring unit 510 and the setting unit 520 is the same as the processing to be performed by the acquiring unit 210 and the setting unit 220 according to the first embodiment.

The propagating unit 530 propagates parallax data at coordinates on a map in a direction of a gradient described by gradient data to replace the parallax data by parallax data with a higher evaluation value. After the parallax data replacement, the gradient data are re-calculated from a distribution of the new parallax data.

In the following description of this embodiment, pixels on an image and correspondence data at coordinates on a map are represented in the same manner as those of the first embodiment.

Figure 6:
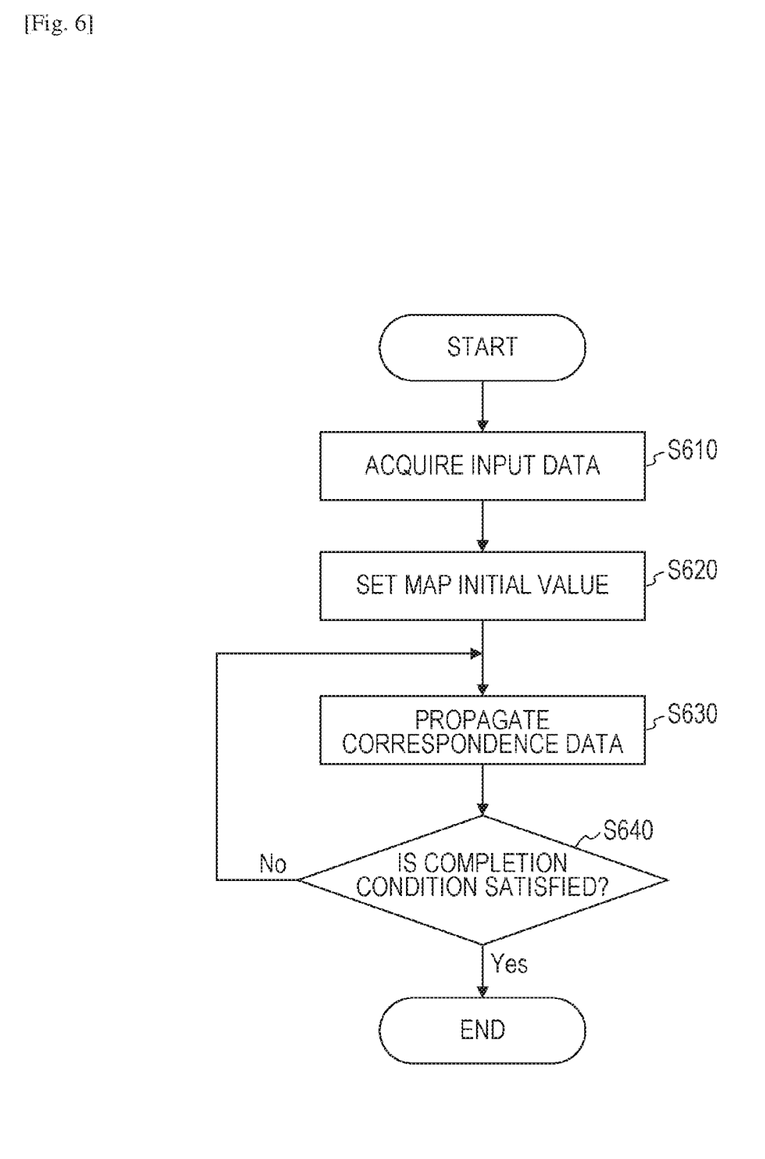
FIG. 6 is a flowchart illustrating processing to be executed in the information processing apparatus according to the second embodiment.

Next, a processing procedure according to this embodiment will be described. FIG. 6 is a flowchart illustrating a processing procedure of this embodiment.

Step S610

The acquiring unit 510 acquires two images I1 and I2 acquired by photographing an object from different photographing positions. The processing in this step is the same as the processing in S310 according to the first embodiment.

Step S620

The setting unit 220 sets initial values of parallax data of coordinates on a map. The processing in this step is the same as the processing in S320 according to the first embodiment.

Step S630

The propagating unit 240 first calculates (or generates) gradient data of coordinate on a map from a distribution of parallax data of surrounding coordinates. Parallax data are propagated in a direction of a gradient described by the generated gradient data to replace an initial value of the parallax data set in the setting unit 220 by parallax data with a higher evaluation value.

More specifically, for each coordinate position on a map, gradient data are calculated by using a gradient filter from parallax data at a surrounding position, and parallax data are propagated in a direction of the gradient of the gradient data.

In order to do so, coordinate positions on the map are sequentially selected. Here, like the first embodiment, a coordinate position is selected in order from an upper left coordinate position to a lower right coordinate position on the map in a manner according to raster scan. FIG. 4 illustrates a map 410. FIG. 4 further illustrates a selected coordinate position 420. Hereinafter, the selected coordinate position are at (u,v).

Next, parallax data are propagated from a surrounding coordinate position of the selected coordinate position (u,v). According to this embodiment, parallax data of two of left and upper coordinate positions of the selected coordinate position (u,v), that is, parallax data at coordinates (u−1,v) and coordinates (u,v−1) are propagated toward the coordinates (u,v). In this case, the parallax data are changed in the direction of the gradient indicated by the gradient data. More specifically, in a case where the original coordinates with parallax data to be propagated are (s,t), the resulting coordinates are calculated by the following Expression (8). However, unlike the first embodiment, because a map does not hold gradient data, gradient data are calculated in accordance with a distribution of parallax data on the current map. More specifically, gradient data Gx(s,t) and Gy(s,t) in Expression (8) are calculated by using gradient filters expressed in Expressions (9) and (10).

$$C'(u, v) = C(s, t) + (u - s)^* Gx(s, t) + (v - t)^* Gy(s, t) \quad (8)$$

[Math. 4]

$$Gx(s, t) = \frac{C(s + k, t) - C(s - k, t)}{2k} \quad (9)$$

[Math. 5]

$$Gy(s, t) = \frac{C(x, t + k) - C(s, t - k)}{2k} \quad (10)$$

Here, correspondence data C'(u,v) are acquired by propagating parallax data at coordinates (s,t) toward the selected coordinate position at (u,v). As in Expression (8), the correspondence data C'(u,v) are calculated by adding a change corresponding to a gradient of the gradient data G(s,t) to the correspondence data C(s,t) to be propagated.

Hereinafter, C1 is parallax data originally present at the coordinates (u,v). C2 and C3 are parallax data generated by propagating parallax data at two coordinate positions at (u−1,v) and (u,v−1).

Next, evaluation values for C1, C2, and C3 are calculated. Specific calculation of an evaluation value is the same as that of the first embodiment and is performed by using Expressions (6) and (7).

Next, the parallax data with the highest evaluation value of the parallax data C1, C2, and C3 at the coordinates (u,v) are allocated on the map as new parallax data at the coordinates (u,v).

This processing replaces parallax data on the map in a case where evaluation values for the parallax data C2 and C3 as a result of a propagation are higher than the evaluation value for the parallax data C1 originally present at the coordinates (u,v).

These operations may be performed on sequentially selected coordinate positions (u,v) so that the parallax data on the entire map may be replaced.

Step S640

In S640, whether this flow is to be ended or not is determined. Specific details of the processing are the same as those of the first embodiment.

According to this embodiment, because gradient data immediately reflecting a distribution of parallax data to be propagated are calculated, an effect can be expected that the parallax data can be converged by true values by fewer repeated calculations.

Third Embodiment

According to a third embodiment, applications using parallax data acquired according to the aforementioned embodiments will be described.

According to the aforementioned embodiments, a parallax of partial regions of stereo images is estimated as a map. The estimated parallax is calculated by using the following expression so that a distance value can be calculated. In other words, when relative positions and orientations of cameras capturing stereo images are known, a parallax and a distance value between the images have a 1-to-1 relationship. Therefore, the parallax and the distance value may be converted to each other.

[Math. 6]

$$D = \frac{f \cdot B}{C} \quad (11)$$

Here f is a focal point distance of cameras, B is a baseline of the stereo cameras (stereo camera interval), D is a distance value, and C is a parallax. The distance value may be converted to three-dimensional coordinates for output. A distance value or three-dimensional coordinates may be output to measure a three-dimensional shape of an object. As described above, in a case where correspondence data are to be converted, the information processing apparatus according to this embodiment may further include a correspondence data converting unit. As the correspondence data, a distance value may be held on a map instead of a parallax.

On the basis of the output distance value or three-dimensional coordinates, a position and an orientation of an object to be observed on the images may be measured. For example, in a case where a three-dimensional model of an object to be observed on the images is known, ICP (Iterative Closest Point) may be performed between the three-dimensional model and an estimated distance value so that the position and orientation of the object can be estimated.

Other applications will further be described. On the basis of parallax data between two images, the two images may be overlaid one upon another such that a difference represented by the parallax data between the images can be minimized to synthesize a panorama image from the two images. Tendencies of different parallax data sets may be divided with reference to a threshold value to divide objects shown on a background and a foreground of an image for object detection. For example, such parallax data may be used as input data to an SLAM (Simultaneous Localization and Mapping) applying a distance sensor based on information regarding a distance value calculated from stereo images. For example, in order to estimate a map representing correspondence data of three-dimensional voxel data, a plurality of three-dimensional voxel data sets may be synthesized on the basis of the correspondence data for higher accuracy.

Variation examples of the first and second embodiments will be described below. It should be noted that a processing result of an embodiment according to a variation example as will be described below may be used to perform the processing according to the third embodiment.

First Variation Example

According to a variation example, information excluding parallax data is estimated as correspondence data. First, a two-dimensional vector is used.

According to the aforementioned embodiments, a one-dimensional parallax in an X axis direction of an image is handled as correspondence data. According to this variation example, a two-dimensional parallax in X axis and Y axis directions of an image are handled as correspondence data. In order to estimate a two-dimensional parallax, correspondence data of two images can be estimated with higher accuracy even under a condition that a correspondence between local regions of the images is not in an X axis direction of the images.

According to this variation example, a map representing a correspondence between two images is estimated. One of two images for which a correspondence is to be calculated is indicated by I1, and the other one is indicated by I2. Pixel values of the images are indicated by I1(u,v) and I2(u,v). The letters "u" and "v" refer to coordinates on an X axis and a Y axis on each of the images.

The map holds a parameter with reference to one of the two images. According to this variation example, a map based on the image I1 is held. Therefore, the map is a two-dimensional arrangement having an equal number of elements (pixels) to that of the images. In this case, for example, two-dimensional parallax data at coordinates (u,v) on the map represent a difference between coordinates (u,v) on the image I1 and corresponding coordinates on the image I2. Here, the two-dimensional parallax data are represented by a two-dimensional vector indicating a difference between coordinates in the X axis and the Y axis.

Parallax data of each coordinate position on the map are represented by C(u,v), and gradient data thereof are represented by Gx(u,v) and Gy(u,v). The correspondence data C(u,v) are represented by a two-dimensional vector indicating a parallax on two images. Here, C(u,v) includes two components of a difference Cx(u,v) in an X axis direction and a difference Cy(u,v) in a Y axis direction. The gradient data Gx(u,v) and Gy(u,v) are represented by two-dimensional vectors indicating gradients at C(u,v) in X axis and Y axis directions of the map. A notation "G(u,v)" refers to a vector including both of Gx(u,v) and Gy(u,v). Like the second embodiment, the gradient data may not be held on the map.

This variation example has the same configuration as that of the first or second embodiment. A processing procedure according to this variation example converts the formula described according to the first or second embodiment to a dimension of correspondence data according to this variation example for calculation. For example, a setting unit may set initial values for two components of two-dimensional correspondence data. An updating unit is configured to calculate a gradient of two components of two-dimensional correspondence data. A propagating unit is configured to propagate parallax data of each coordinate position on a map in a direction of a gradient represented by two components of gradient data to replace by parallax data with a higher evaluation value. The evaluation value to be acquired by Expression (6) and Expression (7) in the propagating unit are calculated by Expression (12) that is a variation of Expression (7) using two components of two-dimensional correspondence data.

$$D(u,v,m,n,C)=|I1(u+m,v+n)-I2(u+m+Cx(u,v),v+n+Cy(u,v))| \quad (12)$$

Here, Cx(u,v) and Cy(u,v) represent a parallax with respect to an X axis and a Y axis included in parallax data C(u,v). Expression (11) measures a difference between pixel values under a condition that there are parallaxes in an X axis and a Y axis.

By changing the operations as described above, the correspondence data can be extended to a two-dimensional vector having two components.

The correspondence data according to the present invention may be a two-dimensional vector, as described above. The correspondence data according to the present invention may also be a two- or higher dimensional vector. For example, information describing a scale of a local region on an image or information describing a rotation of a local region may be added to the correspondence data. Gradient data may be held in accordance with the number of dimensions of the correspondence data. In other words, gradient data are held for each component of dimensions of the correspondence data.

For example, when information describing a scale or a rotation is held as parallax data, an evaluation value for the parallax data is calculated on the basis of the scale or rotation of the parallax data. More specifically, for example, in order to add a scale Cs as a component of parallax data, Expression (12) is varied as in Expression (13).

$$D(u,v,m,n,C)=|I1(u+m,v+n)-I2(u+Cs(u,v)*Cx(u,v),v+Cs(u,v)*Cy(u,v))| \quad (13)$$

In Expression (12), with reference to coordinates (u,v) of interest on the image I1 to be compared, a change equivalent to a scale Gs is added to coordinates within a local region, and the resulting coordinates are compared with coordinates of corresponding pixels on the image I2. Also in a case where information describing a rotation of a local region to parallax data, a change in coordinate due to the rotation is added for comparison in pixel between the images I1 and I2.

A distance value may be used as the correspondence data instead of parallax data between images. When relative positions and orientations of stereo cameras are known, a parallax and distance values of images have a one-to-one relationship. Thus, the parallax and distance values are converted to each other.

Second Variation Example

According to the aforementioned embodiments, a two-dimensional map representing correspondences between coordinates on stereo image being two-dimensional data is estimated. However, a method according to the present invention can also be extended to those excluding two-dimensional input data. Variations of data excluding two-dimensional data may include, for example, one-dimensional input data such as audio and a character string and three-dimensional input data such as a moving picture and a three-dimensional voxel.

In a case where one-dimensional data are input, the processing according to the first and second embodiments may be changed as in the following descriptions. First, a map representing a correspondence between coordinates of the input data has an equal number of dimension that is, one dimension of the input data. In other words, correspondence data with respect to coordinates of one-dimensional input data are held as a one-dimensional map. As gradient data indicating a gradient of correspondence data, a gradient of correspondence data of a one-dimensional coordinate is calculated (while, according to the first and second embodiments, because input data are two-dimensional, gradients of correspondence data with respect to an X axis and a Y axis are calculated).

More specifically, correspondence data with respect to coordinates (which may also be represented as a time for audio data) are estimated from two audio data sets as one-dimensional input data, for example. It is assumed here that values of coordinates of audio input data are represented by a frequency instead of a pixel value. A map in this case is a one-dimensional arrangement having an equal number of elements to the number of elements of audio. In the correspondence data, a difference between coordinates of two audio data sets is represented by one-dimensional vector. The gradient data represents a gradient of correspondence data in a one-dimensional coordinate space on the map. Gradient data are calculated from a distribution of correspondence data on a map in order of the operations according to the first or second embodiment on the basis of the data structure, and the parallax data are propagated in accordance with the gradient data so that the accuracy of the correspondence data on the map can be improved.

In a case where a multi-dimensional data are input, the processing according to the first and second embodiments may be changed as in the following descriptions. First, a map representing a correspondence between coordinates of the input data has an equal number of dimension of the input data. As gradient data indicating a gradient of correspondence data, a gradient in a direction of the corresponding dimension of input data is held.

More specifically, in a variation example handling three-dimensional input data, correspondence data at each set of coordinates are estimated from two moving pictures. A map in this case has a three-dimensional arrangement having an equal number of elements (which is equal to the number of pixels×the number of frames) to that of the moving pictures. In the correspondence data, a difference between coordinates of interest and the corresponding coordinates is represented by a three-dimensional vector. The gradient data represents a gradient in directions of the X axis, the Y axis and the time axis of three components of the correspondence data. Gradient data are calculated from a distribution of correspondence data on a map in order of the operations according to the first or second embodiment on the basis of the data structure, and the correspondence data are propagated in accordance with the gradient data so that the accuracy of the correspondence data on the map can be improved.

Third Variation Example

According to the first and second embodiments, if stereo images are input, processing is performed for acquiring a correspondence between partial regions of the images. However, the present invention is not limited to input of a plurality of data sets like stereo images but is applicable to one input data set. For example, when one image is input, the most similar regions of coordinate positions may be calculated such that they can be associated within the image. In this case, the first and second embodiments are changed to address one input image instead of stereo images (more specifically, such that processing can be performed by defining as I1=I2).

However, in a case where local regions on an image are associated within the image, correspondence data on the corresponding map may possibly be estimated as parallax=0 if the first and second embodiments are directly applied thereto. This is because the correspondence data with the parallax=0 has the highest evaluation value. In order to avoid this, when the value of a parallax of the correspondence data is substantially equal to 0, a penalty may be added to a formula for the corresponding evaluation value to lower the evaluation value for the parallax data.

Alternatively, three or more input data sets may be applicable. For example, a case may be considered in which a map is to be estimated on the basis of images photographed by three cameras. In this case, a map may be generated based on a coordinate system of an image of a predetermined camera, and matching degrees among regions of images of the three cameras indicated in parallax data held on the map are used to calculate evaluation values. Use of image information regarding the three cameras can provide more accurate evaluation values for the parallax data on the map.

Fourth Variation Example

According to the aforementioned embodiments, in order to calculate an evaluation value for parallax data, a SAD is used to compare image regions. However, any calculation method may be applied if the resulting evaluation for parallax data increases as the matching between local regions on images to be compared increases. An SSD (Sum of Squared Difference) or an NCC (Normalized Cross-Correlation) may be used.

For calculation by comparing local regions, parallax data may be changed for each local region to be compared in accordance with gradient data. In this case, an evaluation value to be acquired by Expression (6) and Expression (7) may be calculated by Expressions (14) and (15) that are variations of Expression (7).

$$D(u,v,m,n,C,G)=|I1(u+m,v+n)-I2(u+m+F(u,v,m,n,C,G),v+n)| \quad (14)$$

$$F(u,v,m,n,C,G)=C(u,v)+Gx(u,v)*m+Gy(u,v)*n \quad (15)$$

Here, as indicated by the function F in Expression (15), the value (parallax value) of the parallax data $C(u,n)$ is increased or is reduced in accordance with the gradient data $Gx$, $Gy$ and the position $(m,n)$ with reference to a center of a local region. Coordinates to be compared for each section of a local region may be calculated on the basis of such gradient data so that an evaluation value therefor can be calculated with higher accuracy.

Fifth Variation Example

According to the first embodiment, the processing involving the updating unit 230 and the propagating unit 240 is repeated, for example. However, according to the present invention, the updating unit 230 and the propagating unit 240 may be executed in any order if parallax data and gradient data on a map are not reset every repetition. The operations in the processing of the repeated calculations may be performed in any order if the gradient data calculated by the updating unit 230 can be used at least once in the propagating unit 240. Under this condition, the order of the processing in the updating unit 230 and the processing in the propagating unit 240 may be changed every repetition, or the number of times of the processing in the updating unit 230 and the processing in the propagating unit 240 may be reduced or be increased.

More specifically, for example, the processing in the propagating unit 240 may only be performed in the first repetition, and the processing in the updating unit 230 and the processing in the propagating unit 240 may be performed in the second and subsequent repetitions.

Other Embodiment

The present invention can also be realized by processing in which one or more programs implementing one or more functions of the aforementioned embodiments are supplied to a system or an apparatus over a network or a storage medium and one or more processors in a computer in the system or the apparatus reads out and executes the program or programs. The present invention can also be realized by a circuit (such as an ASIC) implementing one or more functions.

Advantages

According to the present invention, in order to estimate a map showing a correspondence between input data sets, the correspondence data are propagated on the basis of gradient data calculated from a distribution of the correspondence data. Thus, the map can be estimated with higher accuracy.

Definitions

According to the present invention, input data are a target for which a correspondence is to be estimated. The input data hold information on the basis of a predetermined number of dimensions. For example, input data may be audio data holding a frequency as one-dimensional data or image data holding a brightness value as two-dimensional data. Correspondence data may be any information if the information describes a correspondence relationship between two regions of input data. The information may be information describing a difference between coordinates of two regions of input data or information further containing a scale or a rotation. A map holds, as an element, correspondence data regarding coordinates of at least a part of input data. Gradient data may represent a gradient of correspondence data on a map. Here, the gradient represents a change in correspondence data against a change in coordinate on a map. The map may further hold gradient data.

A setting unit is configured to set an initial value of the correspondence data on the map. The setting unit may apply any method if a value close to a true value can be set for correspondence data of at least a part on the map. Such a value may be set randomly or may be set by applying any other method for estimating correspondence data such as block matching.

An updating unit is configured to calculate a gradient data on the basis of a distribution of the correspondence data.

A propagating unit is configured to propagate correspondence data of coordinates on a map in a direction of a gradient representing the gradient data. Here, if an evaluation value for the propagated correspondence data is higher than the evaluation value for the correspondence data originally present on the map, the correspondence data on the map are replaced. The propagating unit may propagate correspondence data only or may further propagate gradient data.

The evaluation value is calculated in accordance with the matching degree between two regions of input data indicated in the correspondence data. The evaluation value may be calculated by any method if a higher evaluation value can be calculated when two regions are matched.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-091608, filed Apr. 28, 2016, which is hereby incorporated by reference herein in its entirety.

The invention claimed is:

1. An information processing apparatus comprising:
an acquiring unit configured to acquire first data and second data;
a deriving unit configured to derive gradient data representing a gradient of correspondence data representing a correlation between partial data of the first data and partial data of the second data based on neighborhood correspondence data, wherein the gradient derives from difference in distribution of correlation;
an evaluation unit configured to evaluate degree of coincidence between the partial data of the first data and the partial data of the second data; and
a propagating unit configured to propagate the correspondence data in accordance with the gradient data and to replace the correspondence data with neighborhood correspondence data which exists in a neighborhood on the distribution in a case where the degree of coincidence between the partial data of the first data and the partial data of the second data which has derived the neighborhood correspondence data is larger than the degree of coincidence between the partial data of the first data and the partial data of the second data which has derived the correspondence data.

2. The information processing apparatus according to claim 1, further comprising a control unit configured to control the deriving unit and the propagating unit such that processing to be performed by the deriving unit and processing to be performed by the propagating unit can be repeated until the correspondence data satisfies a predetermined condition.

3. The information processing apparatus according to claim 2,
wherein the deriving unit derives new gradient data on the basis of correspondence data updated by propagation of correspondence data performed by the propagating unit; and
wherein the propagating unit propagates correspondence data on the basis of the newly derive gradient data.

4. The information processing apparatus according to claim 1,
wherein the first data and the second data are a first image and a second image, respectively, acquired by imaging an object from different imaging positions; and
wherein the correspondence data are data representing a parallax between a partial region of the first image and a partial region of the second image.

5. The information processing apparatus according to claim 4, wherein the correspondence data are held as a map having an identical arrangement as that of the first image and the second image.

6. The information processing apparatus according to claim 5,
wherein the evaluating unit further evaluates the correspondence data on the basis of the gradient data.

7. The information processing apparatus according to claim 4,
wherein the data representing the parallax are data based on a coordinate position of the partial region of the first image or a coordinate position of the partial region of the second image.

8. An information processing apparatus comprising:
an acquiring unit configured to acquire first data and second data from input data;
a deriving unit configured to derive gradient data representing a gradient of correspondence data representing a correlation between partial data of the first data and partial data of the second data based on neighborhood correspondence data, wherein the gradient derives from difference in distribution of correlation;
an evaluation unit configured to evaluate degree of coincidence between the partial data of the first data and the partial data of the second data; and
a propagating unit configured to propagate the correspondence data in accordance with the gradient data and to replace the correspondence data with neighborhood correspondence data which exists in a neighborhood on the distribution in a case where the degree of coincidence between the partial data of the first data and the partial data of the second data which has derived the neighborhood correspondence data is larger than the degree of coincidence between the partial data of the first data and the partial data of the second data which has derived the correspondence data.

9. An information processing method comprising:
acquiring first data and second data;
gradient data representing a gradient of correspondence data representing a correlation between partial data of the first data and partial data of the second data based on neighborhood correspondence data, wherein the gradient derives from difference in distribution of correlation;
evaluating degree of coincidence between the partial data of the first data and the partial data of the second data; and
propagating the correspondence data in accordance with the gradient data and to replace the correspondence data with neighborhood correspondence data which exists in a neighborhood on the distribution in a case where the degree of coincidence between the partial data of the first data and the partial data of the second data which has derived the neighborhood correspondence data is larger than the degree of coincidence between the partial data of the first data and the partial data of the second data which has derived the correspondence data.

10. A non-transitory computer readable storage medium storing a program causing a computer to execute an information processing method according to claim 9.

11. An information processing method comprising:
acquiring first data and second data from input data;
deriving gradient data representing a gradient of correspondence data representing a correlation between partial data of the first data and partial data of the second data based on neighborhood correspondence data, wherein the gradient derives from difference in distribution of correlation;
evaluating degree of coincidence between the partial data of the first data and the partial data of the second data; and
propagating the correspondence data in accordance with the gradient data and to replace the correspondence data with neighborhood correspondence data which exists in a neighborhood on the distribution in a case where the degree of coincidence between the partial data of the first data and the partial data of the second data which has derived the neighborhood correspondence data is larger than the degree of coincidence between the partial data of the first data and the partial data of the second data which has derived the correspondence data.

12. A non-transitory computer readable storage medium storing a program causing a computer to execute an information processing method according to claim 11.

* * * * *